(12) United States Patent
Shukh (10) Patent No.: US 7,301,727 B2
(45) Date of Patent: Nov. 27, 2007

(54) RETURN POLE OF A TRANSDUCER HAVING LOW THERMAL INDUCED PROTRUSION

(75) Inventor: Alexander M. Shukh, Savage, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 541 days.

(21) Appl. No.: 10/880,808

(22) Filed: Jun. 30, 2004

(65) Prior Publication Data

US 2004/0240108 A1 Dec. 2, 2004

Related U.S. Application Data

(63) Continuation-in-part of application No. 10/027,046, filed on Dec. 20, 2001, now abandoned.

(51) Int. Cl.
*G11B 5/127* (2006.01)
(52) U.S. Cl. .................................... 360/125
(58) Field of Classification Search ............... None
See application file for complete search history.

(56) References Cited

U.S. PATENT DOCUMENTS

| | | | | |
|---|---|---|---|---|
| 4,656,546 A | 4/1987 | Mallory | ...................... | 360/110 |
| 4,860,139 A | 8/1989 | Hamilton | ...................... | 360/126 |
| 4,982,301 A | 1/1991 | Endo | ...................... | 360/125 |
| 5,452,164 A | 9/1995 | Cole et al. | ...................... | 360/113 |
| 5,493,464 A | 2/1996 | Koshikawa | ...................... | 360/113 |
| 5,495,379 A | 2/1996 | McNeil et al. | ...................... | 360/125 |
| 5,640,753 A | 6/1997 | Schultz et al. | ...................... | 29/603.08 |
| 5,680,283 A * | 10/1997 | Tanaka et al. | ...................... | 360/125 |
| 5,710,683 A | 1/1998 | Sundaram | ...................... | 360/126 |
| 5,822,153 A | 10/1998 | Lairson et al. | ...................... | 360/234.7 |
| 5,894,389 A | 4/1999 | Kanamine | ...................... | 360/126 |
| 6,018,862 A | 2/2000 | Stageberg et al. | ...................... | 29/603.14 |
| 6,025,977 A | 2/2000 | Hu et al. | ...................... | 360/113 |
| 6,069,775 A | 5/2000 | Chang et al. | ...................... | 360/126 |
| 6,072,671 A | 6/2000 | Gill et al. | ...................... | 360/126 |
| 6,122,144 A | 9/2000 | Chang et al. | ...................... | 360/122 |
| 6,130,809 A | 10/2000 | Santini | ...................... | 360/317 |
| 6,151,193 A | 11/2000 | Terunuma et al. | ...................... | 360/126 |
| 6,156,375 A | 12/2000 | Hu et al. | ...................... | 427/116 |
| 6,198,607 B1 | 3/2001 | Cain et al. | ...................... | 360/318.1 |
| 6,212,047 B1 | 4/2001 | Payne et al. | ...................... | 360/318.1 |
| 6,296,776 B1 | 10/2001 | Sasaki | ...................... | 216/22 |
| 6,342,311 B1 | 1/2002 | Inturi et al. | ...................... | 428/692 |
| 6,477,007 B1 | 11/2002 | Shukh et al. | ...................... | 360/126 |
| 6,501,619 B1 * | 12/2002 | Sherrer et al. | ...................... | 360/126 |
| 6,504,675 B1 | 1/2003 | Shukh et al. | ...................... | 360/125 |
| 6,524,491 B1 | 2/2003 | Liu et al. | ...................... | 216/22 |
| 6,594,122 B1 | 7/2003 | Shukh | ...................... | 360/317 |
| 6,621,659 B1 | 9/2003 | Shukh et al. | ...................... | 360/126 |
| 6,657,813 B2 | 12/2003 | Nishida et al. | ...................... | 360/125 |
| 6,661,605 B1 | 12/2003 | Pust et al. | ...................... | 360/126 |
| 6,710,973 B2 | 3/2004 | Okada et al. | ...................... | 360/125 |
| 6,721,131 B2 | 4/2004 | Litvinov et al. | ...................... | 360/125 |
| 6,816,339 B1 * | 11/2004 | Litvinov et al. | ...................... | 360/125 |

(Continued)

*Primary Examiner*—David Davis (57) ABSTRACT

A transducer including a return pole having a return pole tip extending to an external surface of the transducer. The external surface of the return pole tip has an area that is larger than a cross-sectional area of the return pole taken parallel to the external surface but at a back gap region within the transducer a distance from the external surface.

8 Claims, 7 Drawing Sheets

U.S. PATENT DOCUMENTS 7,075,756 B1 * 7/2006 Mallary et al. ............. 360/317
7,149,045 B1 * 12/2006 Mallary et al. ............... 360/55
2002/0071208 A1 * 6/2002 Batra et al. ................. 360/125
2003/0081359 A1 5/2003 Pust et al. .................. 360/319

* cited by examiner

RETURN POLE OF A TRANSDUCER HAVING LOW THERMAL INDUCED PROTRUSION

CROSS-REFERENCE TO RELATED APPLICATION

This application is a continuation-in-part of U.S. patent application Ser. No. 10/027,046 filed Dec. 20, 2001 now abandoned, and entitled "PERPENDICULAR READ/WRITE HEAD FOR USE IN A DISC DRIVE STORAGE SYSTEM".

FIELD OF THE INVENTION

The present invention relates generally to a transducer capable of converting both an electrical signal into a magnetic field and converting a sensed magnetic field into an electrical signal, and more particularly, but not by limitation, to a transducer having a return pole tip at an external surface of the transducer and a cross-sectional area taken parallel to the external surface that is larger at the external surface than at a back gap region.

BACKGROUND OF THE INVENTION

Write heads are used in combination with a magnetic medium to record data thereto. The magnetic medium, which may be in the form of a magnetic disc, includes a storage layer. The write or recording head is configured to generate a magnetic field that aligns magnetic moments of the storage layer to represent the desired bits of data.

Magnetic recording techniques include both longitudinal and perpendicular recording techniques. Perpendicular recording is a form of magnetic recording in which magnetic moments representing bits of data are oriented perpendicularly to the surface of the storage layer of the recording medium, as opposed to longitudinally along a track of the medium as in the more traditional longitudinal recording technique.

Perpendicular recording techniques have the potential to support higher linear areal recording densities than conventional longitudinal designs. One factor that plays a role in the areal density at which a perpendicular write head is capable of recording data to the magnetic medium is the head-media spacing (HMS). The HMS is the distance between the write head and the magnetic medium. Performance of the write head is very sensitive to the HMS. In particular, as the HMS is reduced, the areal recording density capability of the write head increases. However, the HMS must also be large enough to avoid contact between the write head (or the slider supporting the write head) and the magnetic medium.

Perpendicular magnetic write heads typically include main and return poles that are separated by a write gap. The main and return poles each extend from pole tips located at an air-bearing surface (ABS) to a back gap region. A back gap portion typically connects the main and return poles together at the back gap region to form a magnetically conductive path therebetween. A coil typically surrounds the back gap portion and is used to generate magnetic signals through the main and return poles in response to a current conducted therethrough. The magnetic signals are focused at the main pole tip such that they interact with a storage layer of a magnetic medium to orient a vector of magnetization in an up or down direction. The orientation of the magnetization in the storage layer of the magnetic medium represent bits of data. The return pole conventionally has a very large volume relative to the main pole. Additionally, the return pole has a large cross-sectional area taken parallel to the ABS in order to prevent the generation of an erasure field that could inadvertently reorient the magnetization in the storage layer of the magnetic medium. Unfortunately, the large return pole can limit the performance of the write head by limiting the minimum HMS for the write head due to thermal induced protrusion of the return pole.

The write head is generally comprised of a substrate and several metallic and insulating layers. During operation, the head is subjected to increased temperatures due to head dissipation in the head caused by the generation of magnetic recording signals by the passing of a current through a coil of the head. As the temperature of the head increases, the metallic layers expand more than the insulating layers. As a result, the metallic layers tend to protrude closer to the magnetic medium than the insulating layers, which affects the HMS and, thus, the recording capability of the write head.

The change in HMS caused by such an expansion is typically referred to as a thermal pole tip protrusion (TPTP). TPTP has become increasingly significant due to a need to reduce the HMS in order to meet the increasing demands for higher areal density recording capabilities. The return pole is most sensitive to such protrusion due to its large size relative to the main pole. Thermal induced protrusion of the return pole affect the performance of the write head in primarily two ways. First, the protrusion of the return pole at elevated temperatures increases the possibility of head-disc contact, which sets a limitation of the HMS. Second, the return pole can contribute to reduced write head performance, such as a reduction of writeability, write field gradient, and signal-to-noise ratio, as a result of an increase in the HMS due to a recession of the return pole at low temperatures.

Accordingly, a need exists for a return pole of a perpendicular write head having low thermal induced protrusion while reducing the generation of erasure fields.

SUMMARY OF THE INVENTION

The present invention is directed to a transducer. The transducer includes a return pole having a return pole tip and an external surface. The return pole tip at the external surface has an area that is larger than a cross-sectional area of the return pole taken parallel to the external surface at a back gap region that is distance from the external surface.

Other features and benefits that characterize embodiments of the present invention will be apparent upon reading the following detailed description and review of the associated drawings.

DETAILED DESCRIPTION OF ILLUSTRATIVE EMBODIMENTS

The present invention will be described hereinafter particularly with respect to a perpendicular writer with reference to the main pole, return pole and write gap. Although the below description represents an important embodiment with respect to the application of the perpendicular writers of the invention, the description is by no means limiting with respect to the application of the inventive concept to transducers generally and is meant to be interpreted by way of example and is not intended to limit the scope of the invention or to preclude other applications.

Exemplary Disc Drive Environment

Figure 1:
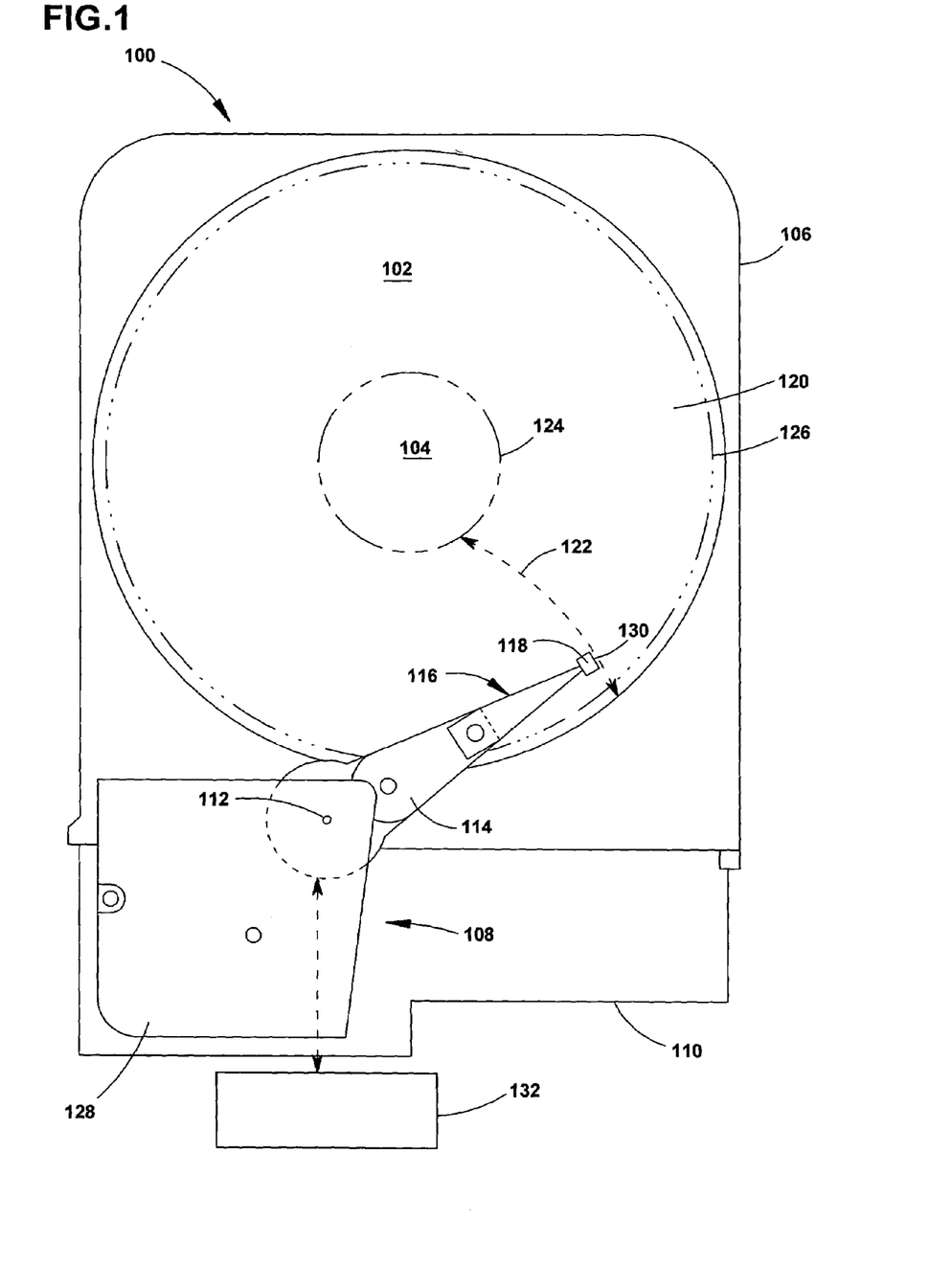
FIG. 1 is a top plan view of an exemplary disc drive with which embodiments of the present invention may be utilized.

FIG. 1 is a top view of a disc drive 100, with which embodiments of the present invention may be used. Disc drive 100 includes a magnetic disc 102 mounted for rotational movement about an axis 104 and driven by a spindle motor (not shown). The components of disc drive 100 are contained within a housing that includes a base 106 and a cover (not shown). Disc drive 100 also includes an actuator 108 mounted to a base plate 110 and pivotally moveable relative to disc 102 about an axis 112. Actuator mechanism 108, includes an actuator arm 114 and a suspension assembly 116. A slider 118 is coupled to suspension assembly 116 through a gimbaled attachment which allows slider 118 to pitch and roll as it rides on an air bearing above a surface 120 of disc 102. Actuator mechanism 108 is adapted to rotate slider 118 on an arcuate path 122 between an inner diameter 124 and an outer diameter 126 of disc 102. A cover 128 can cover a portion of actuator mechanism 108. Slider 118 supports a head 130 at a trailing portion. Head 130 includes separate perpendicular reading and write elements for reading data from, and recording data to disc 102.

During operation, as disc 102 rotates, air (and/or a lubricant) is dragged under air bearing surfaces (ABS) of slider 118 in a direction approximately parallel to the tangential velocity of disc 102. As the air passes beneath the bearing surfaces, air compression along the air flow path causes the air pressure between disc surface 120 and the bearing surfaces to increase, which creates a hydrodynamic lifting force that counteracts a load force provided by suspension 116 and causes slider 118 to "fly" above, and in close proximity to, disc surface 120. This allows slider 118 to support head 130 in close proximity to the disc surface 120.

A drive controller 132 controls actuator mechanism 108 through a suitable connection. Drive controller 132 can be mounted within disc drive 100 or located outside of disc drive 100. During operation, drive controller 132 receives position information indicating a portion of disc 102 to be accessed. Drive controller 132 receives the position information from an operator, from a host computer, or from another suitable controller. Based on the position information, drive controller 132 provides a position signal to actuator mechanism 108. The position signal causes actuator mechanism 108 to pivot about axis 112. This, in turn, causes slider 118 and the head 130 it is supporting to move radially over disc surface 120 along path 122. Once head 130 is appropriately positioned, drive controller 132 then executes a desired read or write operation.

Read/Write Heads of the Prior Art

Figure 2:
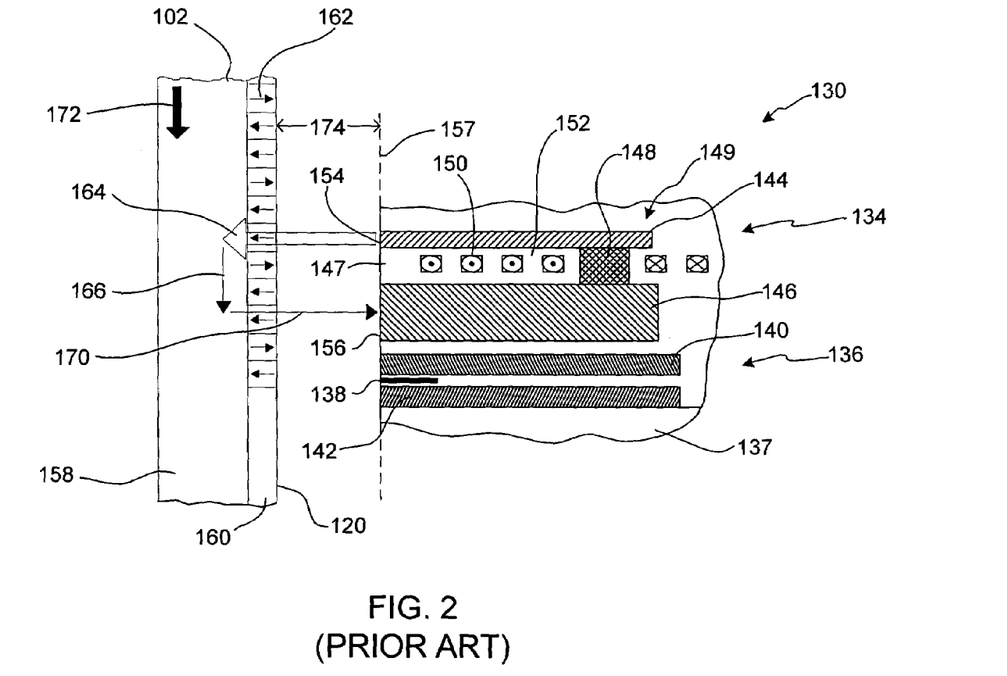
FIG. 2 is a simplified cross-sectional view of a read/write head in accordance with the prior art.
Figure 3:
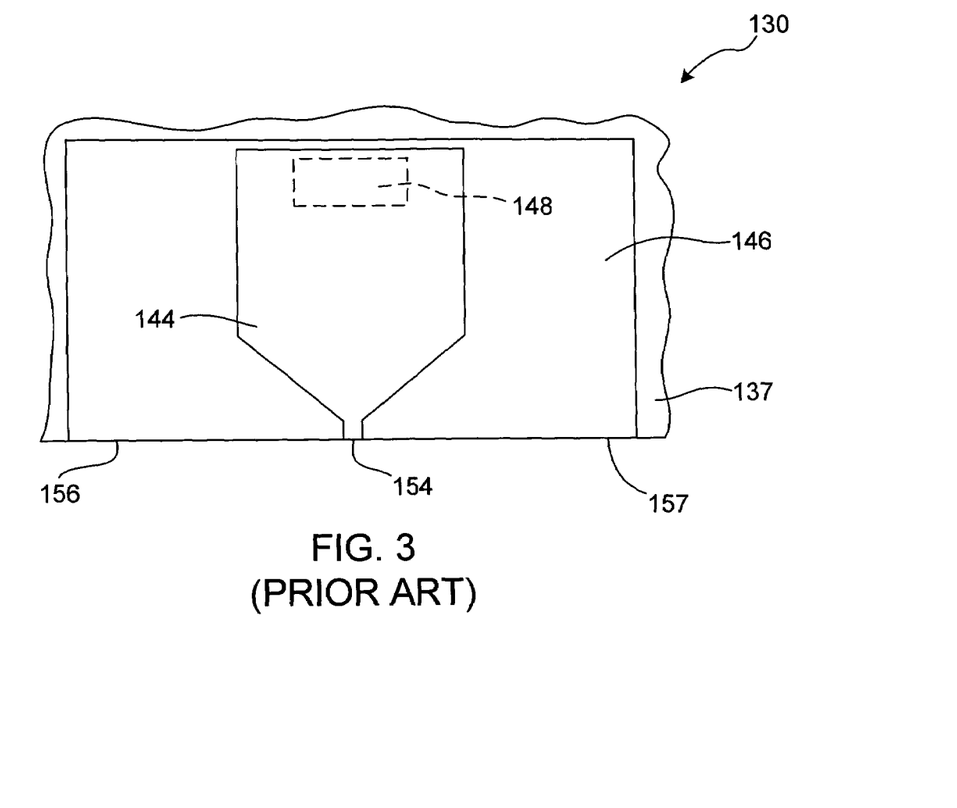
FIG. 3 is a simplified top plan view of the read/write head of FIG. 2.
Figure 4:
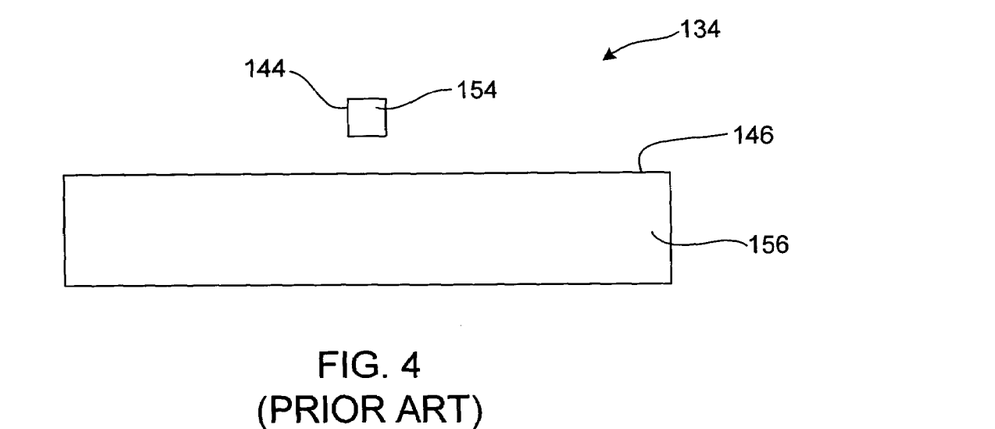
FIG. 4 is a simplified layered diagram of a portion of the read/write head of FIG. 2 as viewed from the recording medium.

Various simplified views of a magnetic read/write head 130 in accordance with the prior art is shown in FIGS. 2-4. FIG. 2 is a side cross-sectional view of head 130, FIG. 3 is a top plan view of head 130, and FIG. 4 is a layered diagram of a portion of head 130 as viewed from disc 102. Some components of head 130, such as a read element, a conductive coil, insulating layers, and other components of head 130 are not shown in FIGS. 3 and 4 to simplify the illustrations. Head 130 includes a perpendicular writing element 134 and a reading element 136 formed on an insulating substrate 137. Reading element 136 of head 130 includes a read sensor 138 that is spaced between top and bottom shields 140 and 142. The top and bottom shields 140 and 142 operate to isolate the read sensor 138 from external magnetic fields that could affect its sensing bits of data that have been recorded on disc 102.

Writing element 134 includes a writing main pole 144 and the return pole 146. The main and return poles 144 and 146 are separated by a write gap or write gap layer 147. Main pole 144 and return pole 146 are connected by a back gap "via" or portion 148 at a back gap region 149. A conductive coil 150 extends between main pole 144 and return pole 146 and around back gap portion 148. An insulating material 152 electrically insulates conductive coil 150 from main and return poles 144 and 146, and can form the write gap layer 147. Main and return poles 144 and 146 include main and return pole tips 154 and 156, respectively, which face disc surface 120 and form a portion of an air-bearing surface (ABS) 157, as shown in FIGS. 2 and 4.

A magnetic circuit is formed in writing element 134 by main and return poles 144 and 146, back gap portion 148, and a soft magnetic layer 158 of disc 102 which underlays a hard magnetic or storage layer 160. Storage layer 160 includes uniformly magnetized regions 162, each of which represent a bit of data in accordance with their up or down orientation of magnetization. In operation, an electrical current is caused to flow in conductor coil 150, which induces a magnetic flux that is conducted through the magnetic circuit. The magnetic circuit causes the magnetic flux to travel through the main pole tip 154 and storage layer 160 of the recording medium substantially perpendicularly to disc surface 120, as indicated by arrow 164. Next, the magnetic flux is directed through soft magnetic layer 158 of the recording medium, as indicated by arrow 166, then back through storage layer 160 through return pole tip 156 of return pole 146, as indicated by arrow 170. Finally, the magnetic flux is conducted back to main pole 144 through back gap portion 148.

As disc 102 rotates in the direction indicated by arrow 172, main pole tip 154 concentrates the magnetic flux traveling therethrough to such an extent that the orientation of the magnetization in patterns 162 of storage layer 160 are forced into alignment with the writing magnetic field and, thus, cause bits of data to be recorded therein. To perform such data recording, the magnetic field in storage layer 160 at main pole tip 154 must exceed the saturation field of that layer. The magnetic flux is concentrated at the main pole tip 154 by making the disc-facing surface area of the main pole tip relatively small, as shown in FIG. 4.

Since return pole 146 is positioned downstream of the main pole 144 relative to the rotation of disc 102, the disc-facing surface area (FIG. 4) of return pole tip 156 must be formed very large to prevent the undesired erasure of the data recorded by the main pole 144. In other words, the disc-facing surface of the return pole tip 156 must be formed large enough to ensure that the magnetic flux returning through the return pole tip 156, indicated by arrow 170, cannot saturate the storage layer 160 and cause the recorded magnetization patterns 162 to change.

Head-Media Spacing and Thermal Protrusion

One characteristic of the head 130 that has a substantial impact on its writing performance is the spacing 174 between the ABS 157 of the writing element 134 and the disc 102, which is also known as the head-media spacing (HMS). The smaller the operating HMS, the higher the areal density at which data can be recorded to the disc 102. However, the HMS must also be large enough to avoid contact between the write head 130 and the disc 102.

Unfortunately, temperature effects on the head 130, and particularly, the perpendicular writing element 134, limit the HMS for the head 130 due to different coefficients of thermal expansion (CTE) of the materials that form the head 130. The substrate 137, insulating layers (e.g., layer 152), and metallic layers (e.g., coil 150, main pole 144, and return pole 146) each have different CTE's. The substrate 137, typically formed of AlSiTi, has a. CTE that is much smaller than the CTE of the metallic materials (e.g., NiFe, CoNiFe, CoFe, copper, and gold) and the insulating materials (e.g., $Al_2O_3$ and photoresist). Therefore, temperature changes of the head 130 cause a larger change in the volume of the metallic and insulating materials relative to the substrate 137. As a result, high temperatures tend to cause the metallic and insulating layers to protrude from the ABS 157, whereas load temperatures tend to cause the metallic and insulating layers to recede from the ABS 157.

As a result, the minimum HMS is prohibited by the protrusion of the materials of the write element 134, particularly the metallic materials, due to elevated temperatures in the disc drive in which head 130 can operate which can exceed 50° C. The return pole 146 is subject to more thermal induced protrusion than the main pole 144, since it is formed by a larger volume of material. Accordingly, the design of the return pole 146 can play a critical role in the establishment of a minimum HMS for head 130. Unfortunately, it is also necessary to maintain a large disc-facing surface area of the return pole tip 156 in order to avoid inadvertent data erasure.

Return Pole and Magnetic Head of the Present Invention

The present invention is generally directed to a return pole of a perpendicular writing element, which is configured to have low thermal induced protrusion as compared to return poles of conventional perpendicular writing elements, such as writing element 134 discussed above, while still providing a large disc-facing surface area at the return pole tip to prevent undesired data erasures.

Figure 5A:
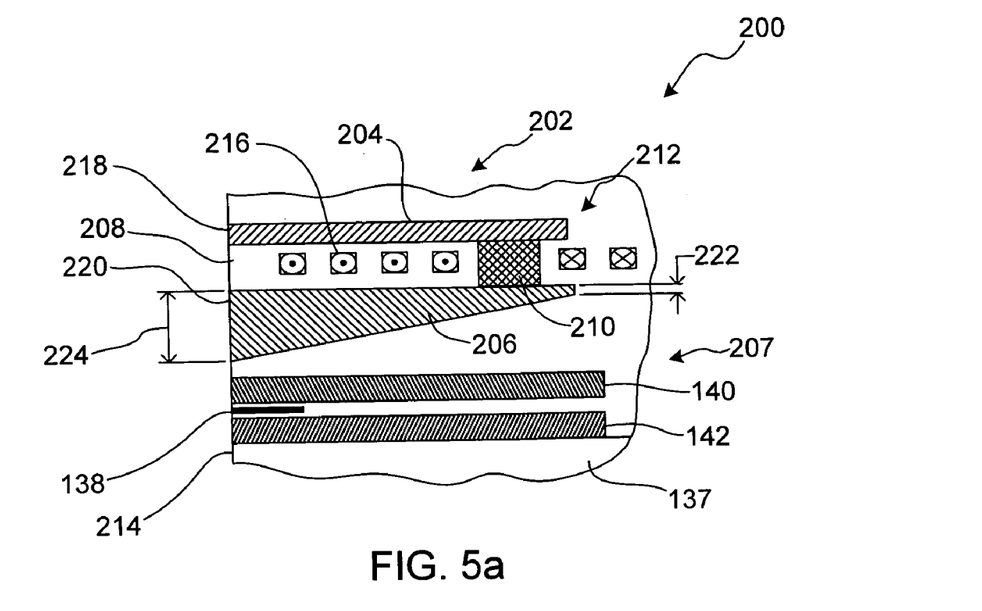
FIGS. 5a through 5e are simplified cross-sectional views of a transducer in accordance with embodiments of the invention.

FIGS. 5a-e, 6a-c and 7 are simplified side views of perpendicular write heads in accordance with various embodiments of the invention. Head 200, shown in FIGS. 5a-e and 6a-c, includes a perpendicular write element 202 having a main pole 204 and a return pole 206 in accordance with various embodiments of the invention. Head 200 can also include a read element 207, as illustrated in FIG. 5a. Main and return poles 204 and 206 are separated by a write gap or write gap layer 208 and are connected by a back gap portion 210 at a back gap region 212 that is opposite an ABS 214. A conductive coil 216, insulated from the main and return poles 204 and 206 by insulative material, conducts current to generate magnetic signals in the main and return poles 204 and 206 and the back gap portion 210. Main pole 204 includes a main pole tip 218 at the ABS 214, which focuses the magnetic signals and directs them into the magnetic medium, such as a disc 102, to record data thereon as described above with respect to writing element 134 shown in FIG. 2.

In accordance with embodiments of the invention, return pole 206 has lower thermal induced protrusion as compared to return poles of prior art perpendicular write elements, such as return pole 144 described above, while still preventing the generation of an erasure field that could reorient magnetization patterns 162 recorded by main pole 204. Undesirable erasure fields are prevented from being generated by return pole 206 by maintaining a large disc-facing surface area at a return pole tip 220. Thermal induced protrusion of return pole 206 is lowered due to a reduced volume of return pole 206, as compared to prior art return poles of perpendicular write elements having a similar depth as return pole 206.

In general, the volume of return pole 206 is reduced by making the cross-sectional area in the back gap region 212 of the return pole 206, taken substantially parallel to the ABS 214, smaller than that proximate the return pole tip 220. In accordance with one embodiment of the invention, the reduced cross-sectional area is achieved by varying at least a thickness of the return pole between the ABS 214 and the back gap region 212. More particularly, the cross-sectional area of return pole 206 taken parallel to the ABS 214 is reduced by reducing a thickness 222 of return pole 206 in back gap region 212 relative to a thickness 224 of the return pole proximate the return pole tip 220, as illustrated in FIGS. 5a-e.

Figure 5B:
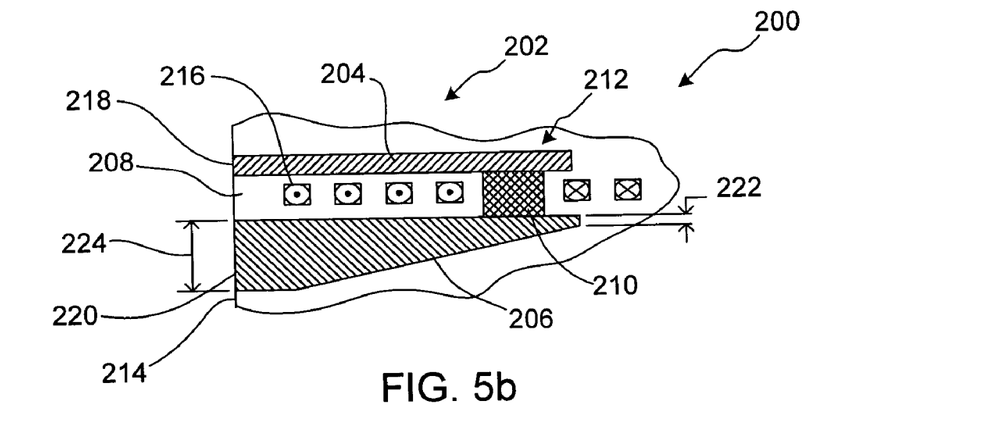

In accordance with the embodiments of the invention depicted in FIGS. 5a and 5b, at least a portion of the thickness of the return pole 206 tapers linearly from the thickness 224 (first thickness) proximate return pole tip 220 to thickness 222 (second thickness).

Figure 5C:
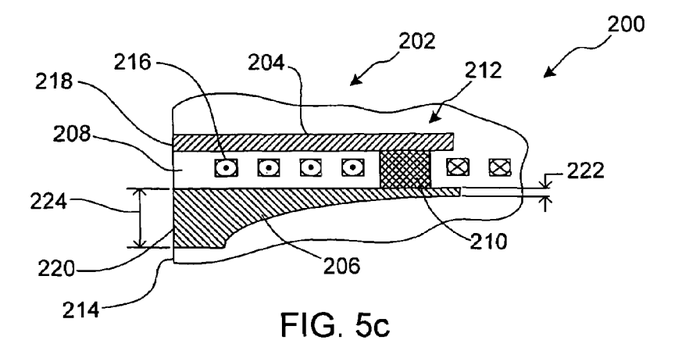
Figure 5D:
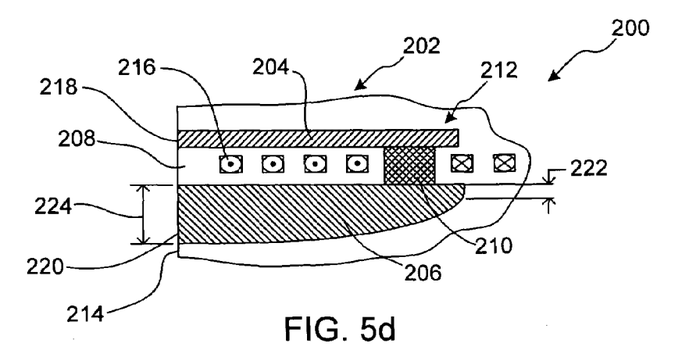
Figure 5E:
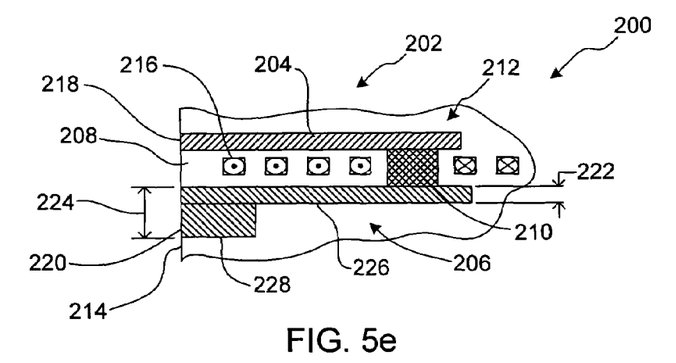

In accordance with another embodiment of the invention, at least a portion of the thickness of the return pole tapers non-linearly from thickness 224 proximate return pole tip 220 to the thickness 222 at the back gap region 212. For example, thickness of return pole 206 can be defined by a curved boundary (e.g., a bottom surface), as shown in FIGS. 5c and 5d, where the thickness is gradually reduced from the thickness 224 to the thickness 222. Alternatively, the thickness of the return pole 206 can be reduced in a step fashion, as illustrated in FIG. 5e where return pole 206 is formed by first and second layers 226 and 228. The first layer 226 extends from the ABS 214 to the back gap region 212 and defines the thickness 222 at the back gap region. The second layer 228 adjoins the first layer 226 at the ABS 214. The thickness 224 proximate the return pole tip 220 is defined by the thickness of the first and second layers 226 and 228. It should be understood, that additional layers can be used to define both the thickness 224 proximate the return pole tip 220 and the thickness 222 in the back gap region 212.

Figure 6A:
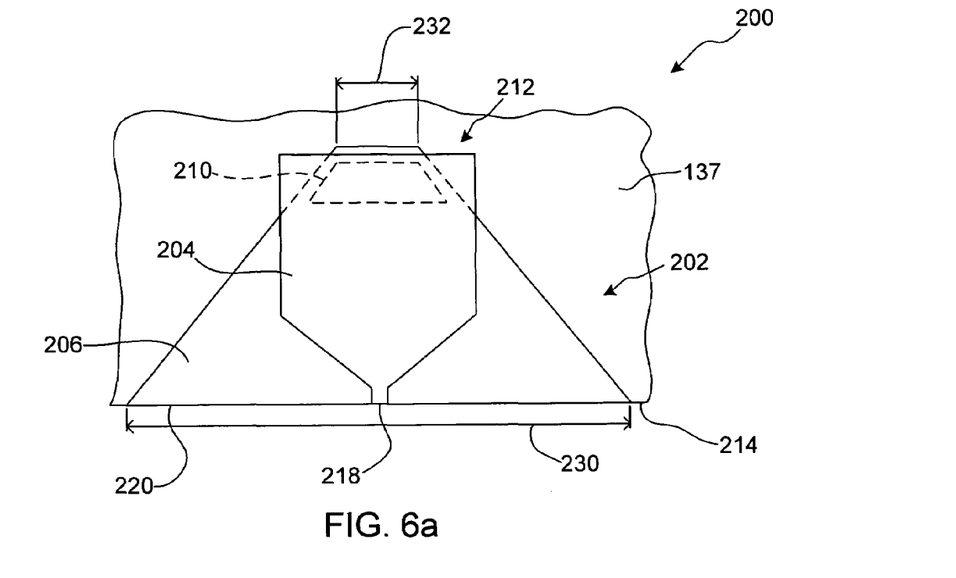
FIGS. 6a through 6c are simplified top plan views of a transducer in accordance with embodiments of the invention.
Figure 6B:
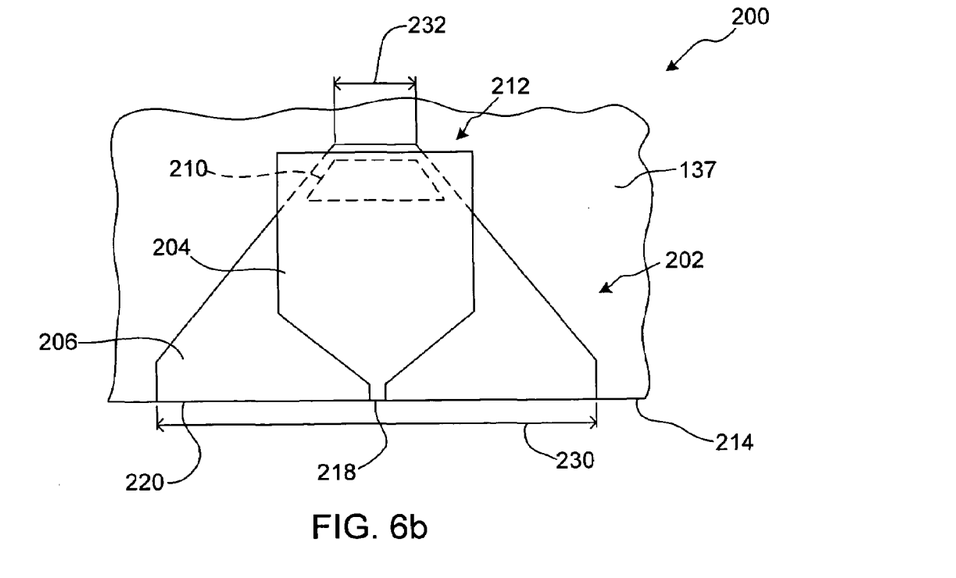
Figure 6C:
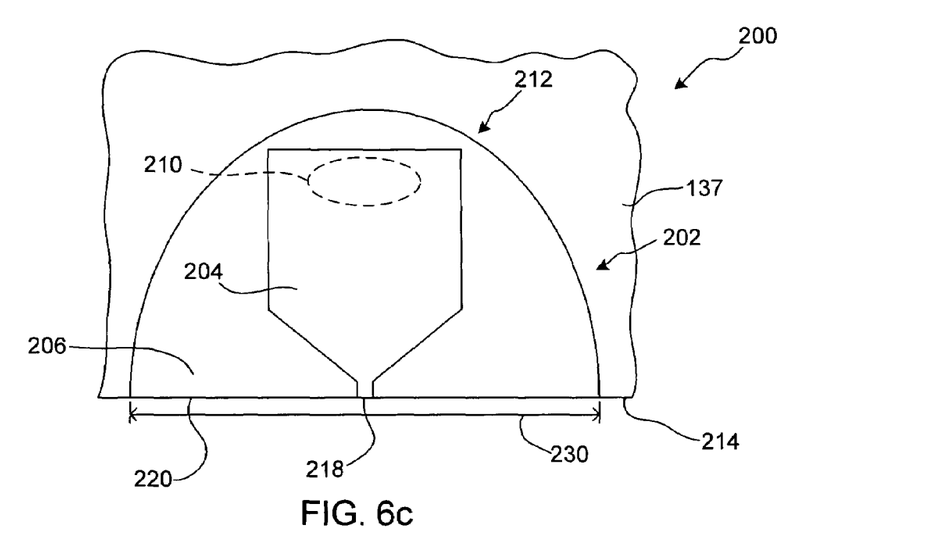

As illustrated in the simplified top plan views of FIGS. 6a-c, the cross-sectional area of the return pole 206 in the back gap region 212, taken substantially parallel to the ABS 214, can also be made smaller than that proximate the return pole tip 220 by varying a width of the return pole 206 between the ABS 214 and the back gap region 212. In accordance with one embodiment of the invention, the width of the return pole 206 is tapered linearly from a width 230 (first width) proximate the return pole tip 220 to a width 232 (second width) at the back gap region 212, as shown in FIGS. 6a and 6b. This is accomplished by tapering one or both of the sides 234 of the return pole 206. In accordance with another embodiment of the invention, the width of the return pole is tapered non-linearly from the width 230 to the width 232. As shown in FIG. 6c, such a width tapering can include the formation of curved sides 234 resulting in a width at the back gap region of approximately zero.

Additional embodiments of the present invention involve combining the width and thickness reduction techniques discussed above. Therefore, return pole 206 can have the desired volume reduction relative to prior art return poles by varying both the width and the thickness of the return pole between the ABS 214 and the back gap region 212 using the techniques discussed above.

Figure 7:
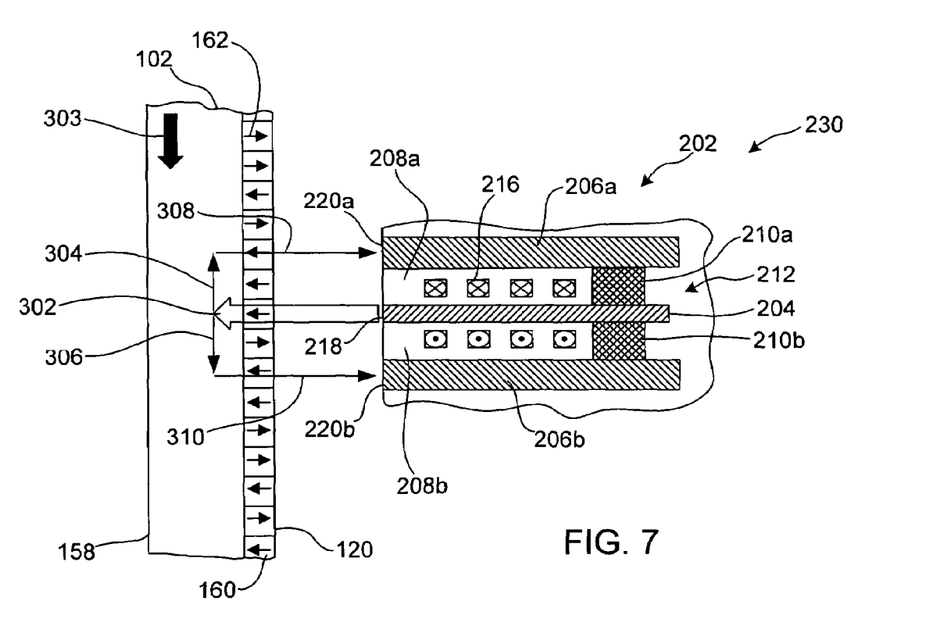
FIG. 7 is a simplified cross-sectional view of a transducer in accordance with embodiments of the invention.

FIG. 7 shows a simplified cross-sectional view of a perpendicular write head 300 in accordance with another embodiment of the invention. Elements depicted in FIG. 7 having labels that are the same as those for elements shown in FIGS. 5a-e and 6a-c are the same or similar elements. The head 300 provides the desired reduced thermal induced protrusion by providing two return poles 206a and 206b each having a relatively low volume as compared to the prior art single return pole counterparts. Return poles 206a and 206b are located on opposing sides of the main pole 204 and separated from the main pole 204 by write gap layers 208a and 208b, respectively. A conductive coil 216 is preferably formed around the main pole 204, but other configurations are possible. Magnetically conductive paths between the main pole 204 and the first and second return poles 206a and 206b are formed by back gap portions 210a and 210b.

During a write operation, current signals are conducted through conductive coil 216 to induce corresponding magnetic signals in the main pole 204. A magnetic circuit is formed in writing element 202 by main pole 204, return poles 206a and 206b, back gap portions 210a and 210b, the soft magnetic layer 158 of disc 102 which underlays a hard magnetic or storage layer 160. When an electrical current is caused to flow in conductive coil 216, magnetic flux signals are induced in main pole 204 that are conducted through the magnetic circuit. Initially, magnetic signals travel through the main pole tip 218 and storage layer 160 of the recording medium substantially perpendicularly to disc surface 120, as indicated by arrow 302. As disc 102 rotates in the direction indicated by arrow 303, main pole tip 218 concentrates the magnetic flux traveling therethrough to such an extent that the orientation of the magnetization in patterns 162 of storage layer 160 are forced into alignment with the writing magnetic field and, thus, cause bits of data to be recorded therein. The magnetic signals are then directed through the soft magnetic layer 158 of the recording medium toward the return poles 206a and 206b, as indicated by arrows 304 and 306, and back through storage layer 160 to the return pole tips 220a and 220b, as indicated by arrows 308 and 310. Finally, the magnetic flux is conducted back to main pole 144 through the return poles 206a and 206b and the corresponding back gap portions 210a and 210b.

Each of the return poles 206a and 206b has a volume that is preferably less than the volume of prior art return poles for perpendicular write elements, such as return pole 146 write element 134 discussed above, even at the return pole tips 220a and 220b, while avoiding the generation of erasure fields at the return pole tips 220a and 220b. This is due to the splitting of the magnetic flux emanating through the main pole tip 218 between the return pole tips 220a and 220b as opposed to directing the magnetic flux to a single return pole element, as discussed above with reference to FIG. 2. Accordingly, the return poles 206a and 206b can have a substantially constant, but smaller cross-sectional area taken parallel to the ABS 214 than their prior art single return pole counterparts. However, in accordance with another embodiment of the invention, at least one of the return poles 206a and 206b includes a varied cross-section between the ABS 214 and the back gap region 212 utilizing one or both of the width or thickness varying techniques discussed above with respect to FIGS. 5a-e and 6a-c.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, without limitation, the read element 207 of head 200 can use the return pole 206 as a top shield thereby eliminating a need for a separate top shield 140, shown in FIG. 5a.

What is claimed is:

1. A perpendicular write head comprising:
   an air-bearing surface (ABS);
   a main pole having a main pole tip at the ABS;
   a return pole having a return pole tip at the ABS, the return pole tip having a disc-facing surface area that is larger than a cross-sectional area of the return pole taken parallel to the ABS at a back gap region that is opposite the ABS, wherein a first width of the return pole tip is larger than a second width of the return pole at the back gap region; and
   a write gap between the main and return pole tips.

2. The write head of claim 1, wherein the width of the return pole tapers linearly from the first width to the second width.

3. The write head of claim 1, wherein the width of the return pole tapers non-linearly from the first width to the second width.

4. The write head of claim 1, wherein the return pole includes a thickness that varies between the ABS and the back gap region.

5. The write head of claim 4, wherein the return pole includes a first thickness proximate the ABS that is larger than a second thickness at the back gap region.

6. The write head of claim 5, wherein the thickness of the return pole tapers linearly from the first thickness to the second thickness.

7. The write head of claim 5, wherein the return pole tapers non-linearly from the first thickness to the second thickness.

8. The write head of claim 5, wherein the return pole includes:
   a first layer extending from the ABS to the back gap region; and
   a second layer adjoining the first layer at the ABS;
   wherein the first thickness is defined by at least the first and second layers.

* * * * *